(12) United States Patent   (10) Patent No.: US 9,720,125 B2
Grayson et al.   (45) Date of Patent: Aug. 1, 2017

(54) SUBTERRANEAN FORMATION OIL MOBILITY QUICKLOOK

(71) Applicant: Schlumberger Technology Corporation, Sugar Land, TX (US)

(72) Inventors: Stephen Thomas Grayson, Camarillo, CA (US); James Lee Hemingway, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 685 days.

(21) Appl. No.: 14/179,383

(22) Filed: Feb. 12, 2014

(65) Prior Publication Data

US 2014/0224482 A1   Aug. 14, 2014

Related U.S. Application Data

(60) Provisional application No. 61/764,896, filed on Feb. 14, 2013.

(51) Int. Cl.
*G01V 3/28* (2006.01)
*E21B 47/12* (2012.01)

(52) U.S. Cl.
CPC .............. *G01V 3/28* (2013.01); *E21B 47/121* (2013.01)

(58) Field of Classification Search
CPC ... G01V 3/28; G01V 3/30; G01V 3/18; G01V 3/40; G01V 3/38; G01V 3/26; G01V 3/00; E21B 47/121; E21B 47/0003; E21B 47/122
See application file for complete search history.

(56) References Cited

U.S. PATENT DOCUMENTS

| | | | |
|---|---|---|---|
| 4,893,084 A * | 1/1990 | Rau | G01V 3/30 324/338 |
| 5,367,262 A | 11/1994 | Manning | |
| 6,246,236 B1 | 6/2001 | Poitzsch et al. | |
| 6,297,639 B1 | 10/2001 | Clark et al. | |
| 6,819,110 B2 | 11/2004 | Omeragic et al. | |
| 7,091,877 B2 | 8/2006 | Barber et al. | |
| 7,436,185 B2 | 10/2008 | Fredette et al. | |
| 7,671,597 B2 | 3/2010 | Finci et al. | |
| 8,237,444 B2 | 8/2012 | Simon | |
| 2004/0032257 A1 | 2/2004 | Freedman | |
| 2007/0061082 A1 * | 3/2007 | Seleznev | G01V 3/30 702/11 |
| 2007/0061083 A1 | 3/2007 | Habashy et al. | |
| 2010/0262370 A1 * | 10/2010 | Bittar | G01V 11/002 702/6 |
| 2010/0307741 A1 | 12/2010 | Mosse et al. | |
| 2011/0221443 A1 | 9/2011 | Bittar et al. | |
| 2011/0251794 A1 * | 10/2011 | Bittar | G01V 3/30 702/11 |

OTHER PUBLICATIONS

International Search Report and Written Opinion issued in PCT/US2014/016343 on May 28, 2014, 15 pages.

* cited by examiner

*Primary Examiner* — Michael Wills, III
(74) *Attorney, Agent, or Firm* — Michael Dae (57) ABSTRACT

A downhole tool is conveyed within a wellbore extending into a subterranean formation, and then utilized to obtain measurements at multiple different depths of investigation within the subterranean formation relative to the wellbore. The obtained measurements are then compared to assess mobility of oil within the subterranean formation.

19 Claims, 8 Drawing Sheets

SUBTERRANEAN FORMATION OIL MOBILITY QUICKLOOK

CROSS-REFERENCE TO RELATED APPLICATIONS

This application claims the benefit of U.S. Provisional Application No. 61/764,896, entitled "Heavy Oil Mobility Quicklook," filed Feb. 14, 2013, to Grayson, et al., the entire disclosure of which is hereby incorporated herein by reference.

BACKGROUND OF THE DISCLOSURE

Wellbores are drilled to locate and produce heavy oil and other forms of hydrocarbons. During drilling, an operator may take actions to evaluate and/or measure properties of subterranean formations that may be encountered, including the liquids and/or gases existent in the subterranean formations. In some cases, the drillstring utilized to create the wellbore is removed, and a wireline tool is deployed within the wellbore to test, evaluate, and/or sample the liquids and/or gases in the subterranean formations. In other cases, the drillstring itself may be provided with devices operable to perform such testing, evaluation, and/or sampling without having to remove the drillstring from the wellbore.

An example of such downhole tools is operable to obtain dielectric measurements of the subterranean formation by emitting electromagnetic energy into the subterranean formation and detecting changes in the energy as it exits the formation. However, utilizing such tools in the evaluation of heavy oil sands may be complicated by low salinity formation water, which reduces the observed contrast between the resistivity of the water and the oil sands.

SUMMARY OF THE DISCLOSURE

The present disclosure introduces a method in which a downhole tool conveyed within a wellbore extending into a subterranean formation, and in communication with surface equipment disposed at a wellsite surface from which the wellbore originates, is operated to obtain a plurality of measurements each at a corresponding one of a plurality of different depths of investigation into the subterranean formation relative to the wellbore. At least one of the downhole tool and the surface equipment is then operated to assess mobility of oil within the subterranean formation based on the obtained plurality of measurements.

The present disclosure also introduces an apparatus comprising a processor and a memory including coded instructions, wherein the processor, the memory, and the coded instructions are collectively operable to cause the apparatus to obtain a plurality of measurements each at a corresponding one of a plurality of different depths of investigation into a subterranean formation relative to a wellbore extending into the subterranean formation. The processor, the memory, and the coded instructions are further collectively operable to assess mobility of oil within the subterranean formation based on the obtained plurality of measurements.

The present disclosure also introduces a computer program product comprising coded instructions stored in a tangible form in a computer readable medium, and operable to cause an apparatus comprising a processor and a memory to obtain a plurality of measurements each at a corresponding one of a plurality of different depths of investigation into a subterranean formation relative to a wellbore extending into the subterranean formation. The computer program product is further operable to cause the apparatus to assess mobility of oil within the subterranean formation based on the obtained plurality of measurements.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed except where specifically noted as indicating a relationship.

Figure 1:
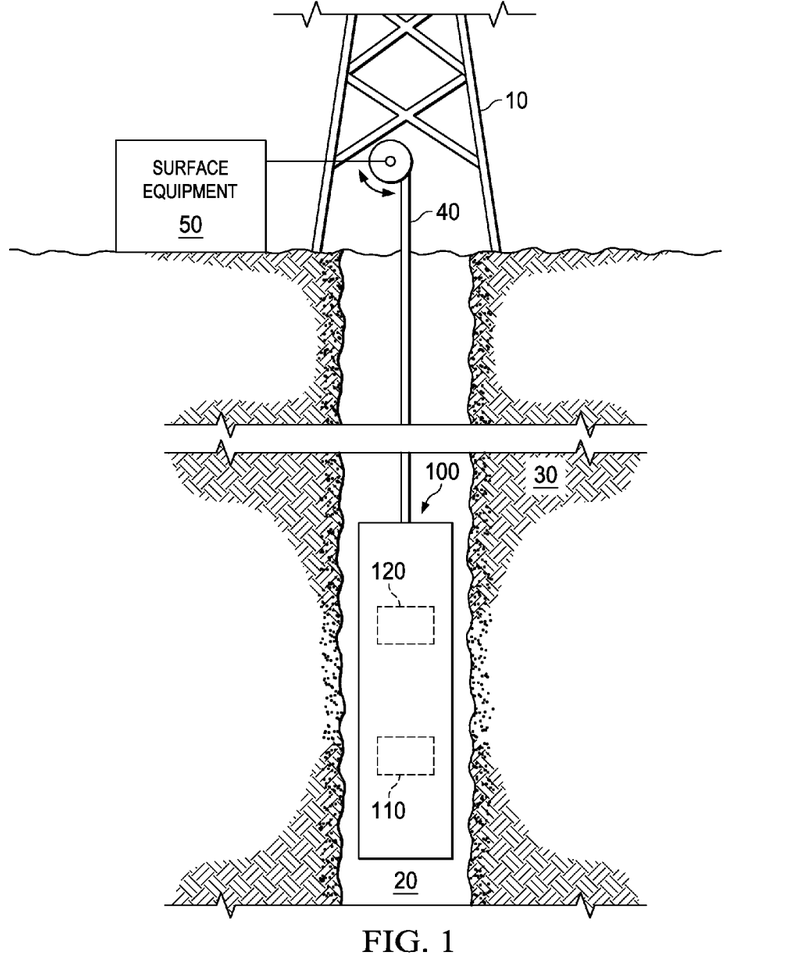
FIG. 1 is a schematic view of at least a portion of apparatus according to one or more aspects of the present disclosure.

FIG. 1 is a schematic view of an example wellsite wireline formation evaluation system that can be employed onshore and/or offshore. As depicted in FIG. 1, a downhole wireline tool 100 may be suspended from a rig 10 in a wellbore 20 formed in one or more geologic formations 30. The downhole wireline tool 100 may be deployed from the rig 10 into the wellbore 20 via a wireline cable 40 and may be positioned within and/or moved through one or more portions of the geologic formation 30. The portion(s) of the wellbore 20 to be tested may have been perforated using various methods, perhaps utilizing explosive charges. As the downhole wireline tool 100 operates, outputs of one or more formation evaluation tools (one of which is designated by reference numeral 110) may be sent via, for example, telemetry to a logging and control computer and/or other surface equipment 50 and/or may be stored in one or more memories of the downhole wireline tool 100 (one of which is designated by reference numeral 120) for subsequent recall and/or processing.

Figure 2:
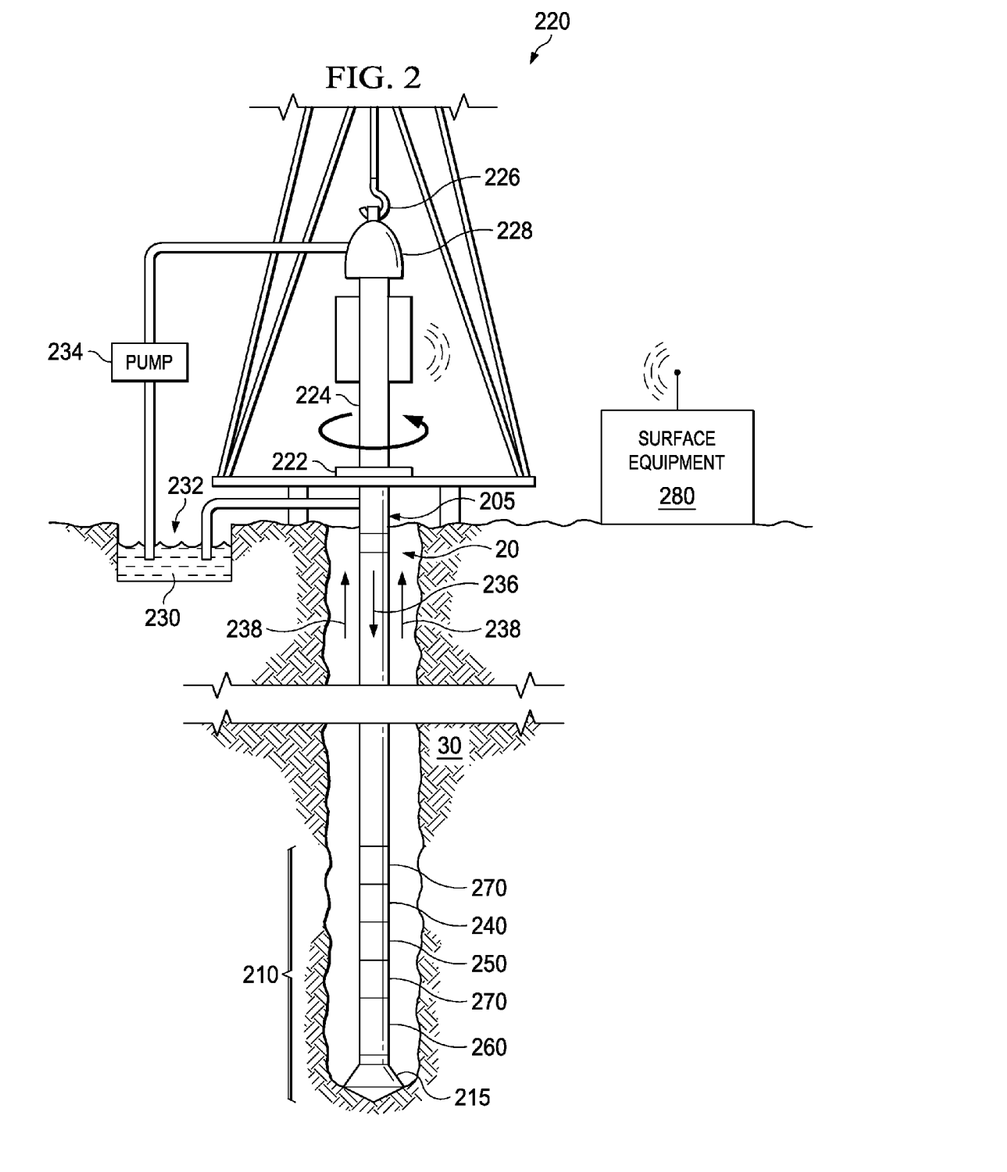
FIG. 2 is a schematic view of at least a portion of apparatus according to one or more aspects of the present disclosure.

FIG. 2 is a schematic view of an example wellsite drilling system that can be employed onshore and/or offshore, perhaps including at the same wellsite as depicted in FIG. 1, where the wellbore 20 may have been formed in the one or more subsurface formations 30 by rotary and/or directional drilling. As depicted in FIG. 2, a drillstring 205 suspended within the wellbore 20 may comprise a bottom hole assembly (BHA) 210 having a drill bit 215 at its lower end. A surface system includes a platform and derrick assembly 220 positioned over the wellbore 20, which may be substantially similar or identical to the rig 10 shown in FIG. 1. The platform and derrick assembly 220 may include a rotary table 222, a kelly 224, a hook 226, and/or a rotary swivel 228. The drillstring 205 may be rotated by the rotary table 222 (energized by means not shown), which engages the kelly 224 at the upper end of the drillstring 205. The drillstring 205 may be suspended from the hook 226, which may be attached to a traveling block (not shown), and through the kelly 224 and the rotary swivel 228, permits rotation of the drillstring 205 relative to the hook 226. A top drive system may also or instead be utilized, yet remain within the scope of the present disclosure.

The surface system may also include drilling fluid 230, which is commonly referred to in the industry as mud, stored in a pit 232 formed at the well site. A pump 234 may deliver the drilling fluid 230 to the interior of the drillstring 205 via a port (not shown) in the swivel 228, causing the drilling fluid to flow downwardly through the drillstring 205 as indicated by the directional arrow 236. The drilling fluid 230 may exit the drillstring 205 via ports in the drill bit 215, and then circulate upwardly through the annulus region between the outside of the drillstring 205 and the wall of the wellbore 20, as indicated by the directional arrows 238. The drilling fluid 230 may be used to lubricate the drill bit 215, carry formation cuttings up to the surface as it is returned to the pit 232 for recirculation.

The BHA 210 may include, among other things, one or more downhole logging tools. Examples of such downhole logging tools within the scope of the present disclosure include a logging-while-drilling (LWD) tool 240, a measuring-while-drilling (MWD) tool 250, a rotary-steerable system and/or mud motor 260, and/or the drill bit 215. One or more other downhole tools and/or modules 270 may also be disposed at one or more locations within the BHA 210.

The LWD tool 240 may be housed in a special type of drill collar, as it is known in the art, and may contain one or more various types of logging tools, formation evaluation tools, and/or formation sampling devices. The LWD tool 240 may include capabilities for measuring, processing, and/or storing information, as well as for communicating with the MWD tool 250 and/or directly with surface equipment 280, such as may include a logging and control computer and/or otherwise be similar to the surface equipment 50 shown in FIG. 1.

The MWD tool 250 may also be housed in a special type of drill collar, and contains one or more devices for measuring characteristics of the drillstring 205 and/or the drill bit 215. The MWD tool 250 may also comprise an apparatus (not shown) for generating electrical power for use by the BHA 210. Example devices to generate electrical power include, but are not limited to, a battery system and a mud turbine generator powered by the flow of the drilling fluid. Example measuring devices may include, but are not limited to, a weight-on-bit measuring device, a torque measuring device, a vibration measuring device, a shock measuring device, a stick slip measuring device, a direction measuring device, and/or an inclination measuring device. The MWD tool 250 may also include capabilities for communicating with the surface equipment 280 using conventional and/or future-developed two-way telemetry systems, such as a mud-pulse telemetry system, a wired drill pipe telemetry system, an electromagnetic telemetry system, and/or an acoustic telemetry system, among others.

The example tools 100, 110, 240, and/or 250 shown in FIGS. 1 and 2 may be utilized in the implementation of one or more aspects of the concepts and methods introduced herein, and may implement one or more various types of formation evaluation sensors, modules and/or tools including, but not limited to, a resistivity measurement tool, a density measurement tool, a photoelectric factor measurement tool, a neutron porosity tool, a pulsed-neutron tool, an acoustic tool, an electromagnetic tool, and/or a magnetic resonance tool. For example, the tools 120, 130, 205, and/or 220 of FIGS. 1 and 2 may have one or more aspects in common with the DIELECTRIC SCANNER and/or one or more other tools commercially available from SCHLUMBERGER.

In at least some implementations within the scope of the present disclosure, one or more of the example tools 100, 110, 240, and/or 250 shown in FIGS. 1 and 2 may utilize multi-frequency dielectric dispersion technology to quantify residual hydrocarbon volume, the Archie mn exponent, and/or the cation exchange capacity (CEC) of the formation 30. These and/or other parameters may be obtained as substantially continuous logs. For example, substantially continuous measurement of dielectric dispersion, or the variation of formation dielectric properties as a function of frequency, may be obtained utilizing a plurality of different array spacings, each perhaps with two polarizations at four frequencies. Subsequent radial interpretation may yield permittivity and conductivity at each frequency, which may be utilized as input for a petrophysical model to obtain water-filled porosity, formation water salinity, textural effects, and/or CEC.

Figure 3:
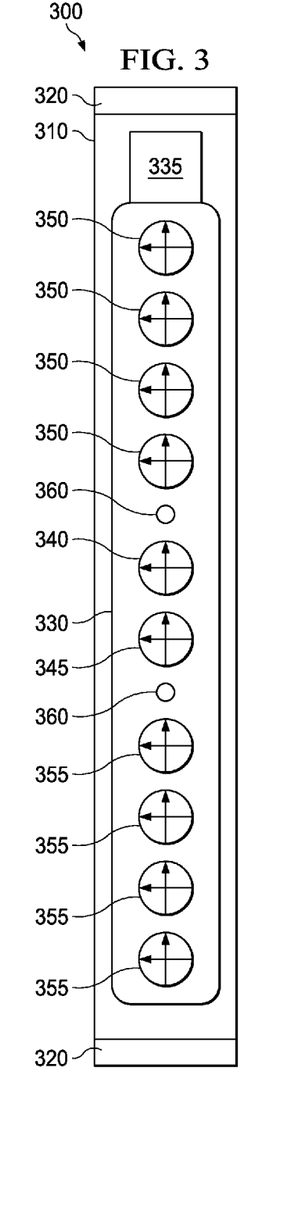
FIG. 3 is a schematic view of at least a portion of apparatus according to one or more aspects of the present disclosure.

FIG. 3 is a schematic view of at least a portion of a downhole tool 300 according to one or more aspects of the present disclosure. The downhole tool 300 is an example implementation of one or more of the tools 100, 110, 240, and/or 250 shown in FIGS. 1 and 2.

The downhole tool 300 comprises a body 310 having an interface 320 at one or both ends. The interface(s) 320 may be conventional or future-developed interfaces for coupling components of a downhole tool string, such as standard box-pin connections.

The downhole tool also comprises an antenna array pad 330. The antenna array pad 330 comprises a plurality of cross-dipole antennas each having collocated magnetic dipoles, perhaps including a plurality of transmitters and/or receivers. For example, the antenna array pad 330 may comprise a first transmitter 340 and a second transmitter 345 near the center of the array, whereas a plurality of first receivers 350 and second receivers 355 may be located symmetrically around the first and second transmitters 340/345.

In FIG. 3, the vertically oriented dipoles (relative to the page) represent the longitudinal polarization, and the horizontally oriented dipoles represent the transverse polarization. The antenna array pad 330 may also comprise two electrical probes 360, which may be utilized for quality control with respect to orienting the antenna array pad 330 relative to the wall of the wellbore. The electrical probes 360 may also be utilized in determining mud and mudcake dielectric properties at the frequencies of interest.

Figure 4:
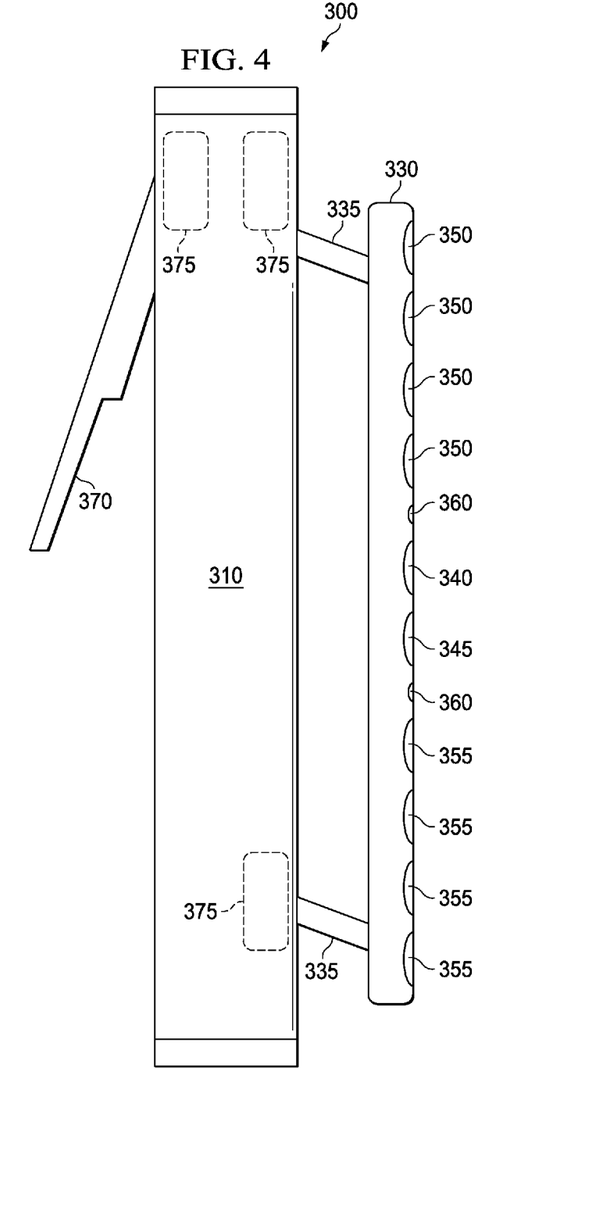
FIG. 4 is a side view of the apparatus shown in FIG. 1.

FIG. 4 is a side view of the downhole tool 300 shown in FIG. 3 in which the antenna array pad 330 is depicted in a deployed orientation, wherein one or more members 335 extend the antenna pad 330 away from the body 310. The antenna array pad 330 may be positioned against the borehole wall by, for example, an anchor 370 that extends away from the body 310 opposite the antenna array pad 330. Orientation of the antenna array pad 330 and the anchor 370 may be via one or more actuators 375, which may be hydraulic, electric, and/or electromechanical, among other types within the scope of the present disclosure.

The first and second transmitters 340/345 are operable to emit electromagnetic waves and/or other forms of energy into the subterranean formation. Such emission may be at various frequencies and/or polarizations, and at various depths of investigation into the formation. For example, the electromagnetic waves may be emitted at four different frequencies and two different polarizations to obtain measurements of the subterranean formation properties at four different depths of investigation into the subterranean formation from the borehole wall.

In heavy oil reservoirs and/or shallow-invasion situations, measurements made in both the invaded and non-invaded zones may be utilized to determine moveable hydrocarbon content. For example, heavy oil sands may contain vast quantities of hydrocarbons and are the objective of many extraction efforts. However, low salinity formation waters can complicate evaluation of heavy oil sands due to the reduced contrast between the resistivity of water and oil sands. Thus, dielectric permittivity measurements may be utilized to provide a water-filled porosity to compare to the total porosity provided by traditional density-neutron logs. The total and water filled porosity measurements may read substantially the same for water sands, while a substantial difference may be observed in oil zones. The magnitude of this difference is proportional to the oil saturation in the near-wellbore region. This can therefore yield an "oil crossover" indicator at the wellsite, which may allow for identification of pay versus water sands, substantially regardless of formation water salinity.

Dielectric measurements may provide a further enhancement to heavy oil evaluation when obtained utilizing a dielectric tool able to interrogate or scan the reservoir with various transmitter/receiver spacings, frequencies, and polarizations. The present disclosure introduces an application of a subset of such measurements to evaluate heavy oil mobility in a wellsite quicklook presentation. For example, a heavy oil mobility quicklook according to one or more aspects of the present disclosure may utilize multiple depths of investigation (DOI) dielectric porosity measurements in the region from about one inch to about four inches into the formation. This near-wellbore region is the focus of investigation because oil movement due to mud filtrate invasion may be limited compared to light oil, gas, or water bearing sands. These four water-filled porosity measurements (one measurement at each of one, two, three, and four inches into the formation) may yield four "oil crossover" evaluations when compared to total porosity. Moreover, these four measurements may provide a straightforward and robust comparison because the four corresponding porosities evaluate substantially similar volumes of reservoir rock with substantially the same electromagnetic excitations. For example, when oil is present, the four water-filled porosities will read less than total porosity. If the oil has not moved with invasion, the four curves will show substantially similar water-filled porosities and overlay one another. However, if the oil has moved due to invasion, the four curves may show separation indicative of the movement.

In other words, one or more aspects of the present disclosure introduce utilizing dielectric permittivity measurements, made at different depths into the formation from the wellbore, to determine the volume of formation water. When the determined volume of formation water is removed from total porosity, the result may indicate the volume of hydrocarbons present in the formation. Moreover, variations in the volume of hydrocarbons at the different depths into the formation may be indicative of hydrocarbon movement into the formation (away from the wellbore), such as may result from invading mud filtrate. This information may then be utilized to determine the mobility of the hydrocarbons in the formation.

Figure 5:
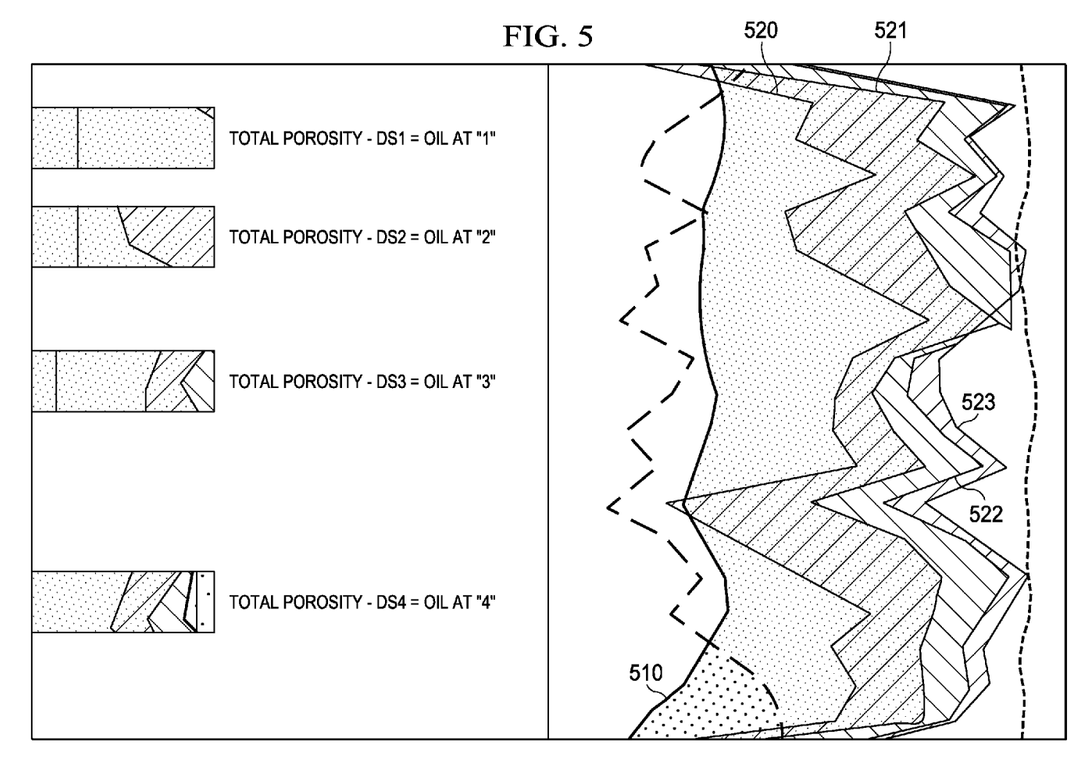
FIG. 5 is an oil mobility quicklook according to one or more aspects of the present disclosure.

FIG. 5 illustrates an example mobility quicklook utilizing four DOI dielectric measurements according to one or more aspects of the present disclosure. The DOI dielectric measurements include: DS1 (at about one inch into the formation), DS2 (at about two inches into the formation), DS3 (at about three inches into the formation), and DS4 (at about four inches into the formation). The measurements DS1, DS2, DS3, and DS4 are presented as curves 520, 521, 522, and 523, respectively, and are presented on the same scale to illustrate their differences. FIG. 5 also illustrates the total porosity measurement 510. Differences in readings between the dielectric curves 520-523 and the total porosity curve 510 indicate the quantity of oil at the four different depths of investigation. The shading in FIG. 5 is provided to illustrate the separation between the curves 520-523.

Figure 6:
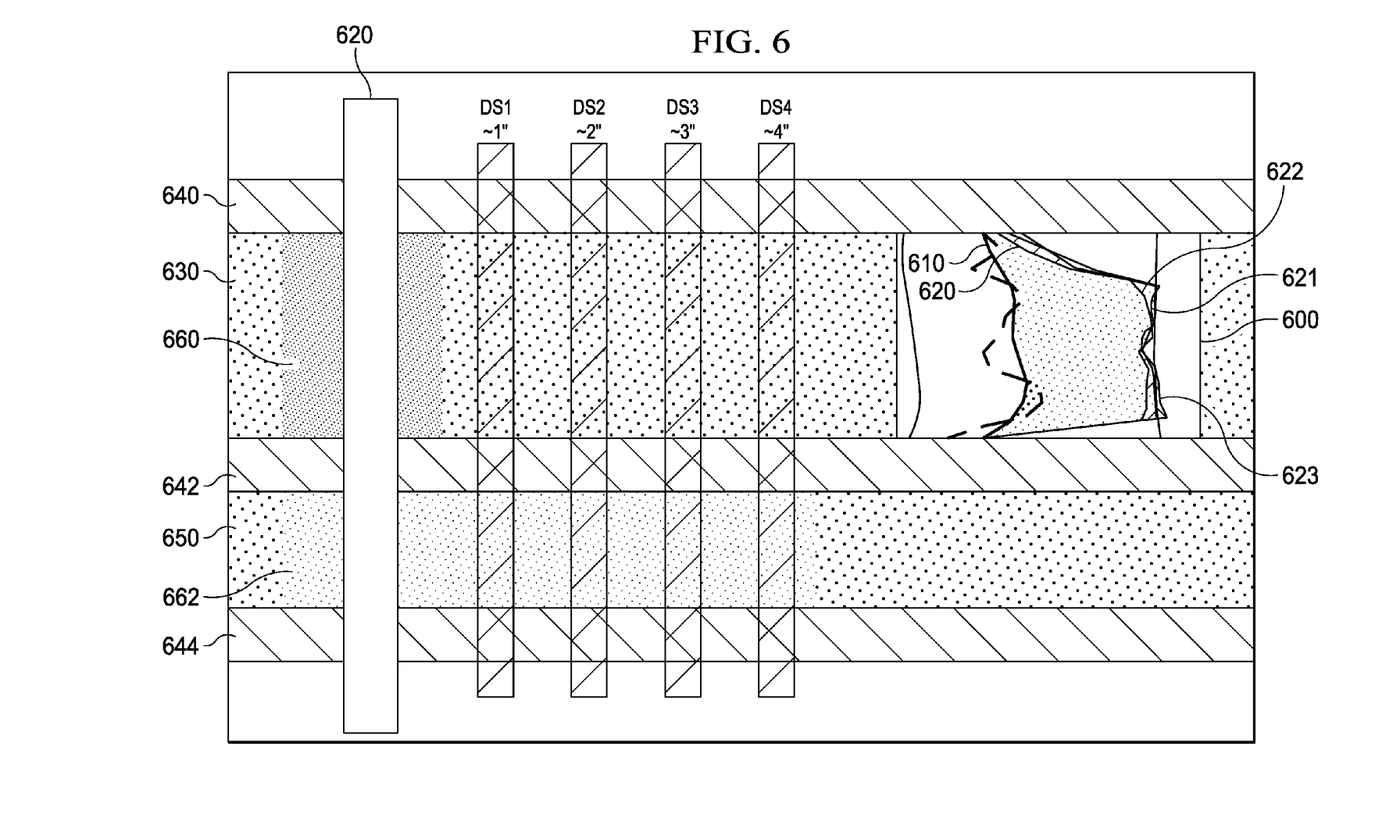
FIG. 6 is an oil mobility quicklook according to one or more aspects of the present disclosure.

FIG. 6 illustrates another example mobility quicklook 600 utilizing four DOI dielectric measurements DS1, DS2, DS3, and DS4 in a zone with low oil mobility. FIG. 6 also graphically depicts the different depths of investigation into the formation for each of the dielectric measurements DS1, DS2, DS3, and DS4, and their proximate location relative to the wellbore 620. The wellbore 620 from which measurements were made extends through an oil sand layer 630 sandwiched between two layers 640 and 642 that are impermeable or otherwise act as barrier layers. The wellbore 620 also extends through a water sand layer 650 sandwiched between the barrier layer 642 and another barrier layer 644. FIG. 6 also depicts the filtrate invasion 660 in the oil sand layer 630 and the filtrate invasion 662 in the water sand layer 650. The mobility quicklook 600 corresponds to and is thus presented in alignment with the oil sand layer 630.

The separation between the total porosity 610 and the four DOI dielectric measurements (represented by curves 620-623) indicates that oil is present. Moreover, the mobility quicklook 600 in the oil sand layer 630 depicts the four DOI dielectric measurement curves 620-623 as being substantially similar and/or otherwise exhibiting little separation. As depicted in FIG. 6, this indicates that the mud filtrate 660 has not pushed the oil very far away from the wellbore 620 within the oil sand layer 630, and that the oil sand layer 630 is of low oil mobility. However, the little to no difference in oil saturation at the different depths of investigation may also indicate very high oil mobility if the oil has been swept beyond the deepest measurement location (e.g., four inches in this example). In the case of very high oil mobility, the oil detected by the four DOI dielectric measurements DS1-DS4 would be the irreducible or residual oil volume. Thus, the little to no separation between the four DOI dielectric measurement curves 620-623 may indicate no (or very low) oil mobility or very high mobility. The difference in response between measured porosity and the four curves 620-623 in the case of low oil mobility would be the oil volume in the undisturbed region of the formation (e.g., $(1-S_W) \times$porosity, where $S_W$ is water saturation of the undisturbed formation), while in a case of very high oil mobility it would be residual oil volume (e.g., $(1-S_{XO}) \times$porosity, where $S_{XO}$ is water saturation obtained from resistivity logging).

Figure 7:
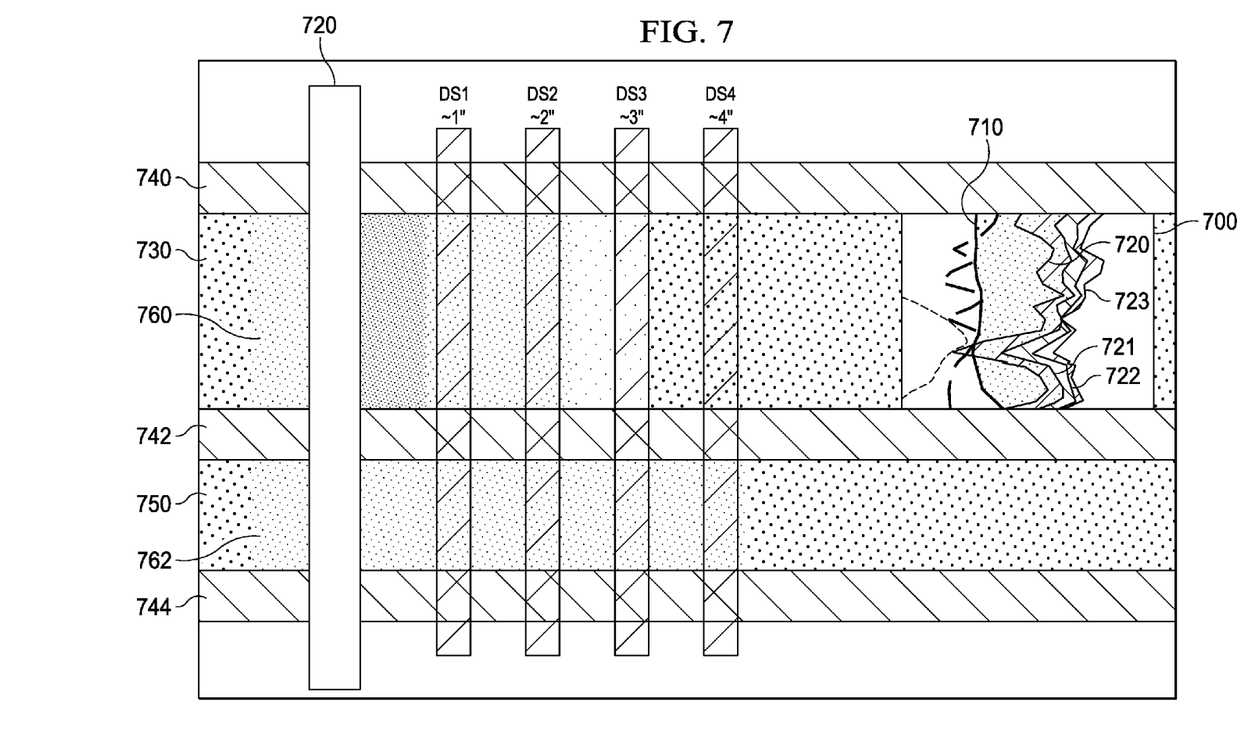
FIG. 7 is an oil mobility quicklook according to one or more aspects of the present disclosure.

FIG. 7 is similar to FIG. 6 but represents four DOI dielectric measurement curves 720-723 as a mobility quicklook 700 in a zone with moderate oil mobility. As with FIG. 6, the wellbore 720 from which the dielectric measurements were made extends through an oil sand layer 730 sandwiched between two layers 740 and 742 that are impermeable or otherwise act as barrier layers. The wellbore 720 also extends through a water sand layer 750 sandwiched between the barrier layer 742 and another barrier layer 744. FIG. 7 also depicts the filtrate invasion 760 in the oil sand layer 730 and the filtrate invasion 762 in the water sand layer 750. The mobility quicklook 700 corresponds to and is thus presented in alignment with the oil sand layer 730. However, the filtrate invasion 760 shown in FIG. 7 extends further away from the wellbore 720 than in the example depicted in FIG. 6.

As with FIG. 6, the separation between the total porosity 710 and the dielectric measurements 720-723 shown in FIG. 7 indicates that oil is present. However, FIG. 7 also depicts moderate separation between the dielectric measurement curves 720-723, indicating an increased mobility relative to the example shown in FIG. 6. Moreover, as a result of the increased oil mobility in the example of FIG. 7, the mud filtrate 760 in the oil sand layer 730 has moved the oil such that a moderate difference in oil saturation is seen at the various depths of investigation.

Figure 8:
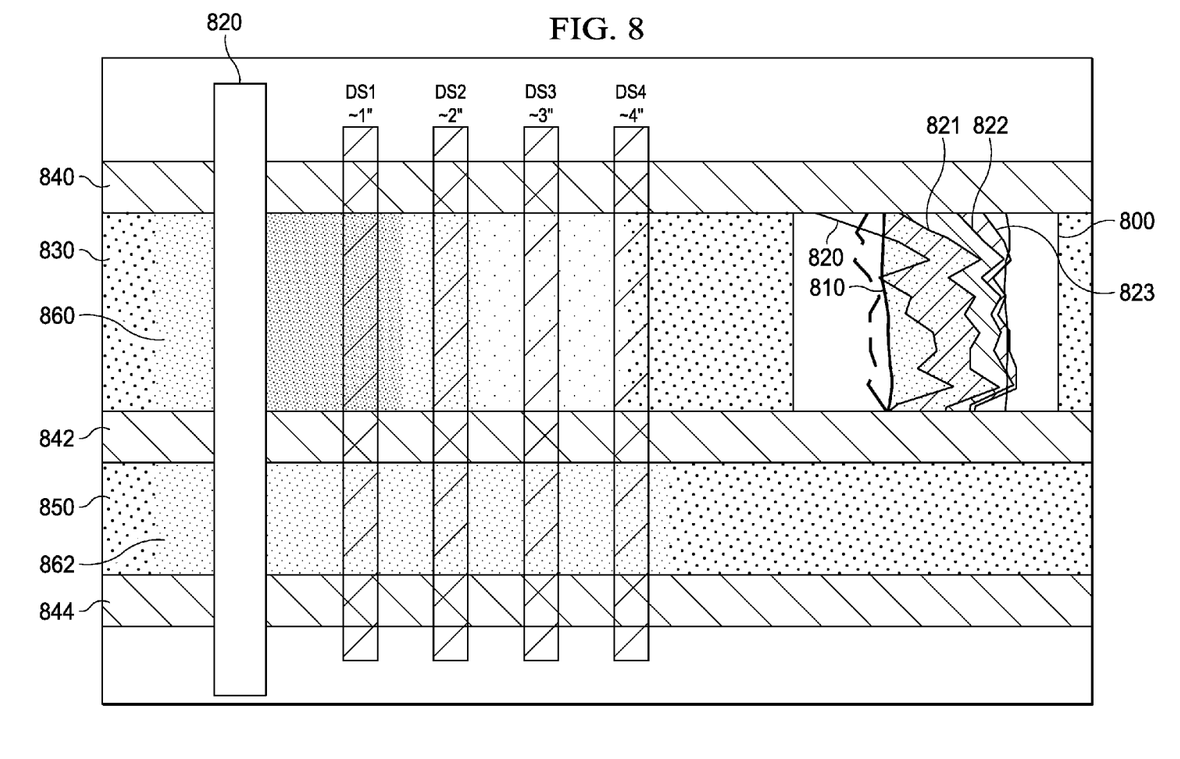
FIG. 8 is an oil mobility quicklook according to one or more aspects of the present disclosure.

FIG. 8 is similar to FIGS. 6 and 7 but represents the four DOI dielectric mobility quicklook in a zone with very good oil mobility. FIG. 8 is similar to FIGS. 6 and 7 but represents four DOI dielectric measurement curves 820-823 as a mobility quicklook 800 in a zone with very good oil mobility. As with FIG. 6, the wellbore 820 from which the dielectric measurements were made extends through an oil sand layer 830 sandwiched between two layers 840 and 842 that are impermeable or otherwise act as barrier layers. The wellbore 820 also extends through a water sand layer 850 sandwiched between the barrier layer 842 and another barrier layer 844. FIG. 8 also depicts the filtrate invasion 860 in the oil sand layer 830 and the filtrate invasion 862 in the water sand layer 850. The mobility quicklook 800 corresponds to and is thus presented in alignment with the oil sand layer 830. However, the filtrate invasion 860 shown in FIG. 8 extends further away from the wellbore 820 than in the examples depicted in FIGS. 6 and 7.

As with FIGS. 6 and 7, the separation between the total porosity 810 and the dielectric measurements 820-823 shown in FIG. 8 indicates that oil is present. However, FIG. 8 also depicts large separation of the dielectric measurement curves 820-823, indicating further increased mobility relative to FIGS. 6 and 7. Moreover, as a result of the further increased oil mobility in the example of FIG. 8, the mud filtrate 860 in the oil sand layer 830 has moved the oil such that a larger difference in oil saturation is seen at the various depths of investigation relative to the example shown in FIG. 7.

FIGS. 6-8 demonstrate that dielectric measurements at multiple depths into the formation (relative to the wellbore) may be utilized to assess the presence of oil at the multiple depths, and that oil mobility can be observed when the dielectric measurements at different depths of investigation are different. When the oil is not mobile, the measurements at multiple depths of investigation will be substantially similar relative to each other. The measurements may be presented as a mobility quicklook on a common scale, such that differences between the measurements may be graphically accentuated. Accordingly, when oil mobility is low, the curves derived from the different DOI dielectric measurements will appear similar, with little or no separation. As mobility increases, the curves derived from the different DOI dielectric measurements will separate.

During experimentation, a dielectric tool operable according to one or more aspects of the present disclosure was utilized in combination with triple combo measurements on a number of wells containing heavy oil sands with varying mobility. Some of these sands were known to contain immobile oil, such that production entailed the introduction of steam. Others of these sands were produced without steam. The four DOI dielectric mobility quicklook according to one or more aspects of the present disclosure showed the expected oil crossover in the immobile oil sands, with the four dielectric curves overlaying each other. In the mobile oil sands, each of the four curves showed variations in the oil crossover. In one of the subject wells, the dielectric and triple combo tools are also combined with a nuclear magnetic resonance (NMR) tool that provided NMR porosity and permeability. The comparison of NMR porosity with the quicklook porosities showed the known NMR porosity deficit in the immobile oil zones, due to the short T2 response of heavy oil. This deficit diminished where the quicklook showed higher oil mobility, confirming the interpretation. Oil mobility has been known to vary unexpectedly in heavy oil reservoirs, for a variety of reasons. The quicklook allowed well-to-well and sand-to-sand mobility comparisons in the field. Non-linear gradations in oil mobility were observed vertically and laterally within the study area.

Operations utilizing one or more aspects of the present disclosure may provide wellsite identification of oil mobility to operators of heavy oil projects. This may allow the operators to adapt completion techniques and hardware to their advantage, such as by optimizing exploitation of the reservoir. Operations within the scope of the present disclosure may also provide an additional measurement to the standard dielectric measurement in the assessment of heavy oil sands.

Figure 9:
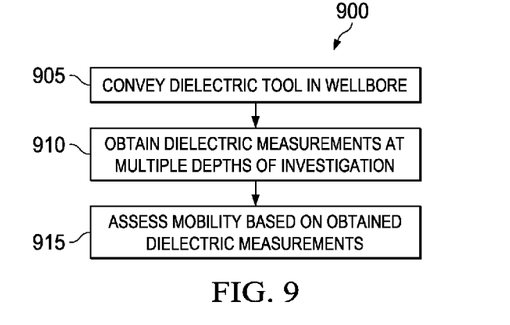
FIG. 9 is a flow-chart diagram of at least a portion of a method according to one or more aspects of the present disclosure.

FIG. 9 is a flow-chart diagram of at least a portion of one such method (900) according to one or more aspects of the present disclosure. The method (900) is one example of the implementation of the concepts described above, although other examples are also within the scope of the present disclosure. The method (900) may be performed by apparatus as described above and shown in FIGS. 1 and 2, as well as other apparatus within the scope of the present disclosure. Execution of the method (900) may result in or facilitate the generation of a mobility quicklook conceptually similar to those shown in FIGS. 6-8.

The method (900) may comprise conveyance (905) of a downhole dielectric tool within a wellbore extending into a subterranean formation of interest. The downhole tool may be or comprise at least a portion of the downhole tool 100 and/or 110 shown in FIG. 1, the downhole tool 240 and/or 250 shown in FIG. 2, and/or other tools within the scope of the present disclosure, and the conveyance may be via wireline, drillstring, and/or other means. The downhole tool and/or its associated surface equipment may comprise at least a portion of the apparatus 1000 shown in FIG. 10. The subterranean formation may comprise heavy oil(s), although one or more aspects of the present disclosure may also be applicable or readily adaptable for utilization in formations containing other types of crude oil.

After conveyance (905), dielectric measurements may be obtained (910) as described above. For example, measurements may be obtained at about one, two, three, and four inches into the formation from the wall of the wellbore. However, one or more aspects of the present disclosure may also be applicable or readily adaptable to methods in which fewer or greater than four measurements are obtained, and/or at different depths of investigation as described above, and such methods are also within the scope of the present disclosure.

The measurements may then be compared (915) to determine or otherwise assess the mobility of oil within the portion of the formation being tested. For example, minimal curve separation of the dielectric measurements may indicate low mobility (such as in the example described above with respect to FIG. 6), moderate curve separation of the dielectric measurements may indicate high mobility (such as in the example described above with respect to FIG. 7), and large curve separation of the dielectric measurements may indicate very high mobility (such as in the example described above with respect to FIG. 8). The comparison (915) may entail generating a graphical mobility quicklook having an appearance similar to those shown in FIGS. 6-8.

Figure 10:
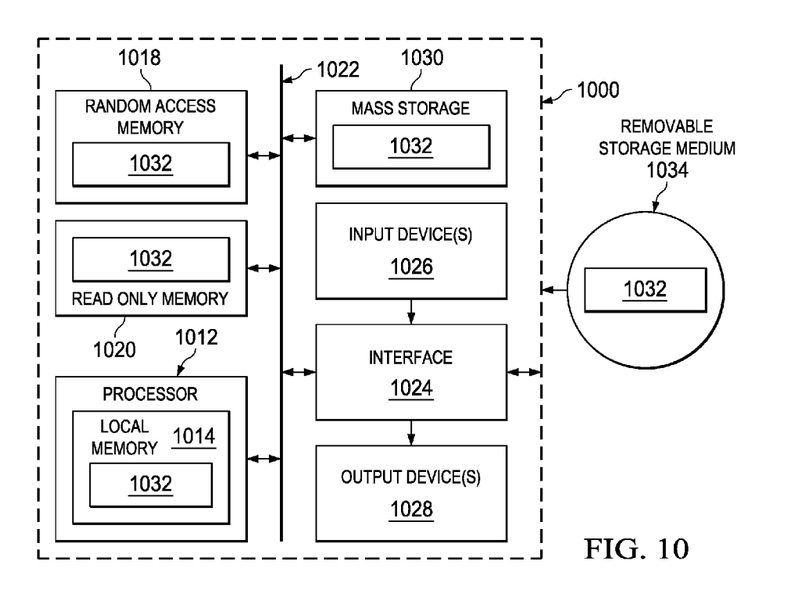
FIG. 10 is a schematic view of at least a portion of apparatus according to one or more aspects of the present disclosure.

FIG. 10 is a block diagram of an example processing system 1000 that may execute example machine-readable instructions used to implement one or more of the methods and/or processes described herein, and/or to implement a portion of one or more of the example downhole tools described herein. The processing system 1000 may be or comprise, for example, one or more processors, controllers, special-purpose computing devices, servers, personal computers, personal digital assistant (PDA) devices, smartphones, internet appliances, and/or other types of computing devices. Moreover, while it is possible that the entirety of the system 1000 shown in FIG. 10 is implemented within the downhole tool, it is also contemplated that one or more components or functions of the system 1000 may be implemented in surface equipment, including the surface equipment described above with respect to FIGS. 1 and 2.

The system 1000 comprises a processor 1012 such as, for example, a general-purpose programmable processor. The processor 1012 includes a local memory 1014, and executes coded instructions 1032 present in the local memory 1014 and/or in another memory device. The processor 1012 may execute, among other things, machine-readable instructions to implement the methods and/or processes described herein. The processor 1012 may be, comprise, or be implemented by various types of processing units, such as one or more INTEL microprocessors, microcontrollers from the ARM and/or PICO families of microcontrollers, embedded soft/hard processors in one or more FPGAs, etc. Of course, other processors from other families are also appropriate.

The processor 1012 is in communication with a main memory including a volatile (e.g., random-access) memory 1018 and a non-volatile (e.g., read-only) memory 1020 via a bus 1022. The volatile memory 1018 may be, comprise, or be implemented by static random access memory (SRAM), synchronous dynamic random access memory (SDRAM), dynamic random access memory (DRAM), RAMBUS dynamic random access memory (RDRAM) and/or other types of random access memory devices. The non-volatile memory 1020 may be, comprise, or be implemented by flash memory and/or other types of memory devices. One or more memory controllers (not shown) may control access to the main memory 1018 and/or 1020.

The processing system 1000 also includes an interface circuit 1024. The interface circuit 1024 may be, comprise, or be implemented by various types of standard interfaces, such as an Ethernet interface, a universal serial bus (USB), and/or a third generation input/output (3GIO) interface, among others.

One or more input devices 1026 are connected to the interface circuit 1024. The input device(s) 1026 permit a user to enter data and commands into the processor 1012. The input device(s) may be, comprise, or be implemented by, for example, a keyboard, a mouse, a touchscreen, a track-pad, a trackball, an isopoint, and/or a voice recognition system, among others.

One or more output devices 1028 are also connected to the interface circuit 1024. The output devices 1028 may be, comprise, or be implemented by, for example, display devices (e.g., a liquid crystal display or cathode ray tube display (CRT), among others), printers, and/or speakers, among others. The interface circuit 1024 may also comprise a graphics driver card. The interface circuit 1024 also includes a communication device such as a modem or network interface card to facilitate exchange of data with external computers via a network (e.g., Ethernet connection, digital subscriber line (DSL), telephone line, coaxial cable, cellular telephone system, satellite, etc.).

The processing system 1000 also includes one or more mass storage devices 1030 for storing machine-readable instructions and data. Examples of such mass storage devices 1030 include floppy disk drives, hard drive disks, compact disk drives, and digital versatile disk (DVD) drives, among others. The coded instructions 1032 may be stored in the mass storage device 1030, the volatile memory 1018, the non-volatile memory 1020, the local memory 1014, and/or on a removable storage medium, such as a CD or DVD 1034.

As an alternative to implementing the methods and/or apparatus described herein in a system such as the processing system 1000 of FIG. 10, the methods and or apparatus described herein may be embedded in a structure such as a processor and/or an ASIC (application specific integrated circuit).

In view of the entirety of the present disclosure, including the figures, a person having ordinary skill in the art will readily recognize that the present disclosure introduces a method comprising: conveying a downhole tool within a wellbore extending into a subterranean formation, wherein the downhole tool is in communication with surface equipment disposed at a wellsite surface from whence the wellbore originates; operating the downhole tool to obtain a plurality of measurements each at a corresponding one of a plurality of different depths of investigation into the subterranean formation relative to the wellbore; and operating at least one of the downhole tool and the surface equipment to assess mobility of oil within the subterranean formation based on the obtained plurality of measurements.

The plurality of measurements may comprise dielectric measurements, such as dielectric permittivity measurements and/or dielectric porosity measurements. The plurality of measurements may include four measurements each at a different depth of investigation into the subterranean formation relative to the wellbore. The different depths of investigation may each be less than about four inches into the subterranean formation relative to the wellbore. The plurality of measurements may include a measurement at each of: about one inch into the subterranean formation relative to the wellbore; about two inches into the subterranean formation relative to the wellbore; about three inches into the subterranean formation relative to the wellbore; and about four inches into the subterranean formation relative to the wellbore.

The plurality of measurements may comprise a plurality of dielectric permittivity measurements, and operating at least one of the downhole tool and the surface equipment to assess the mobility of the oil within the subterranean formation may comprise operating at least one of the downhole tool and the surface equipment to: determine total porosity of the subterranean formation proximate each of the plurality of different depths of investigation; determine volume of water in the subterranean formation proximate each of the plurality of different depths of investigation based on the obtained plurality of dielectric permittivity measurements; determine volume of hydrocarbons in the subterranean formation proximate each of the plurality of different depths of investigation based on: the determined total porosity of the subterranean formation proximate each of the plurality of different depths of investigation; and the determined volume of water in the subterranean formation proximate each of the plurality of different depths of investigation; and assess the mobility of the oil within the subterranean formation based on the determined volume of hydrocarbons proximate each of the plurality of different depths of investigation. Operating the downhole tool to obtain the plurality of measurements at corresponding ones of the plurality of different depths of investigation may comprise operating the downhole tool to generate a substantially continuous log of the plurality of measurements as a function of wellbore depth along the wellbore relative to the wellsite surface, and the method may further comprise: operating at least one of the downhole tool and the surface equipment to generate a plurality of curves each representing the determined volume of oil in the subterranean formation proximate a corresponding one of the plurality of different depths of investigation; operating at least one of the downhole tool and the surface equipment to generate an oil mobility quicklook graphically depicting oil mobility versus wellbore depth; and display the generated oil mobility quicklook to an operator.

Operating the downhole tool to obtain the plurality of measurements may comprise operating the downhole tool to: emit energy into the subterranean formation; and detect the emitted energy as it leaves the subterranean formation. Operating the downhole tool to obtain the plurality of measurements may further comprise extending an antenna array pad away from a body of the downhole tool into contact with a wall of the wellbore. The antenna array pad may carry a plurality of transmitters and a plurality of receivers, and emitting energy into the subterranean formation may comprise operating the plurality of transmitters while detecting the emitted energy as it leaves the subterranean formation may comprise operating the plurality of receivers. The plurality of different depths of investigation may include four different depths of investigation, and operating the plurality of transmitters to emit energy into the subterranean formation may comprise operating the plurality of transmitters to emit electromagnetic energy into the subterranean formation at four different frequencies.

The present disclosure also introduces an apparatus comprising: a processor; and a memory including coded instructions; wherein the processor, the memory, and the coded instructions are collectively operable to cause the apparatus to: obtain a plurality of measurements each at a corresponding one of a plurality of different depths of investigation into a subterranean formation relative to a wellbore extending into the subterranean formation; and assess mobility of oil within the subterranean formation based on the obtained plurality of measurements. The plurality of measurements may comprise dielectric measurements, such as dielectric permittivity measurements and/or dielectric porosity measurements. The plurality of measurements may include four measurements each at a different depth of investigation into the subterranean formation relative to the wellbore. The different depths of investigation may each be less than about four inches into the subterranean formation relative to the wellbore. The plurality of measurements may include a measurement at each of: about one inch into the subterranean formation relative to the wellbore; about two inches into the subterranean formation relative to the wellbore; about three inches into the subterranean formation relative to the wellbore; and about four inches into the subterranean formation relative to the wellbore.

The processor may comprise a first processor and a second processor, the memory may comprise a first memory and a second memory, and the apparatus may further comprise: a downhole tool comprising the first processor and the first memory; and surface equipment located at a wellsite surface from whence the wellbore originates, wherein the surface equipment comprises the second processor and the second memory. The downhole tool may be operable to obtain the plurality of measurements, and the surface equipment may be operable to assess the mobility of the oil.

The plurality of measurements may comprise a plurality of dielectric permittivity measurements, and the processor, the memory, and the coded instructions may collectively be further operable to cause the apparatus to: determine total porosity of the subterranean formation proximate each of the plurality of different depths of investigation; determine volume of water in the subterranean formation proximate each of the plurality of different depths of investigation based on the obtained plurality of dielectric permittivity measurements; determine volume of hydrocarbons in the subterranean formation proximate each of the plurality of different depths of investigation based on: the determined total porosity of the subterranean formation proximate each of the plurality of different depths of investigation; and the determined volume of water in the subterranean formation proximate each of the plurality of different depths of investigation; and assess the mobility of the oil within the subterranean formation based on the determined volume of hydrocarbons proximate each of the plurality of different depths of investigation. The processor, the memory, and the coded instructions may collectively be further operable to cause the apparatus to: generate a substantially continuous log of the plurality of measurements as a function of wellbore depth along the wellbore relative to a wellsite surface from whence the wellbore originates; generate a plurality of curves each representing the determined volume of oil in the subterranean formation proximate a corresponding one of the plurality of different depths of investigation; generate an oil mobility quicklook graphically depicting oil mobility versus wellbore depth; and display the generated oil mobility quicklook to an operator.

The processor, the memory, and the coded instructions may collectively be further operable to cause the apparatus to obtain the plurality of measurements by: emitting energy into the subterranean formation; and detecting the emitted energy as it leaves the subterranean formation. The apparatus may further comprise a body and an antenna array pad, and the processor, the memory, and the coded instructions may collectively be further operable to cause the apparatus to extend the antenna array pad away from the body into contact with a wall of the wellbore.

The present disclosure also introduces a computer program product comprising coded instructions stored in a tangible form in a computer readable medium, and operable to cause an apparatus comprising a processor and a memory to: obtain a plurality of measurements each at a corresponding one of a plurality of different depths of investigation into a subterranean formation relative to a wellbore extending into the subterranean formation; and assess mobility of oil within the subterranean formation based on the obtained plurality of measurements. The plurality of measurements may comprise dielectric measurements, such as dielectric permittivity measurements, and the coded instructions may be further operable to cause the apparatus to: determine total porosity of the subterranean formation proximate each of the plurality of different depths of investigation; determine volume of water in the subterranean formation proximate each of the plurality of different depths of investigation based on the obtained plurality of dielectric permittivity measurements; determine volume of hydrocarbons in the subterranean formation proximate each of the plurality of different depths of investigation based on: the determined total porosity of the subterranean formation proximate each of the plurality of different depths of investigation; and the determined volume of water in the subterranean formation proximate each of the plurality of different depths of investigation; and assess the mobility of the oil within the subterranean formation based on the determined volume of hydrocarbons proximate each of the plurality of different depths of investigation. The coded instructions may be further operable to cause the apparatus to: generate a substantially continuous log of the plurality of measurements as a function of wellbore depth along the wellbore relative to a wellsite surface from whence the wellbore originates; generate a plurality of curves each representing the determined volume of oil in the subterranean formation proximate a corresponding one of the plurality of different depths of investigation; generate an oil mobility quicklook graphically depicting oil mobility versus wellbore depth; and display the generated oil mobility quicklook to an operator.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

The invention claimed is:

1. A method, comprising:
conveying a downhole tool within a wellbore extending into a subterranean formation, wherein the downhole tool is in communication with surface equipment disposed at a wellsite surface from which the wellbore originates;
operating the downhole tool to obtain a plurality of measurements each at a corresponding one of a plurality of different depths of investigation into the subterranean formation relative to the wellbore; and
operating at least one of the downhole tool and the surface equipment to assess mobility of oil within the subterranean formation based on the obtained plurality of measurements,
wherein the plurality of measurements comprises a plurality of dielectric permittivity measurements, and wherein operating at least one of the downhole tool and the surface equipment to assess the mobility of the oil within the subterranean formation comprises operating at least one of the downhole tool and the surface equipment to:
determine total porosity of the subterranean formation proximate each of the plurality of different depths of investigation;
determine volume of water in the subterranean formation proximate each of the plurality of different depths of investigation based on the obtained plurality of dielectric permittivity measurements;
determine volume of hydrocarbons in the subterranean formation proximate each of the plurality of different depths of investigation based on:
the determined total porosity of the subterranean formation proximate each of the plurality of different depths of investigation; and
the determined volume of water in the subterranean formation proximate each of the plurality of different depths of investigation; and
assess the mobility of the oil within the subterranean formation based on the determined volume of hydrocarbons proximate each of the plurality of different depths of investigation, and
wherein operating the downhole tool to obtain the plurality of measurements at corresponding ones of the plurality of different depths of investigation comprises operating the downhole tool to generate a substantially continuous log of the plurality of measurements as a function of wellbore depth along the wellbore relative to the wellsite surface, and wherein the method further comprises:
operating at least one of the downhole tool and the surface equipment to generate a plurality of curves each representing the determined volume of oil in the subterranean formation proximate a corresponding one of the plurality of different depths of investigation;
operating at least one of the downhole tool and the surface equipment to generate an oil mobility quicklook graphically depicting oil mobility versus wellbore depth; and
display the generated oil mobility quicklook to an operator.

2. The method of claim 1 wherein the plurality of measurements comprises dielectric measurements.

3. The method of claim 1 wherein the plurality of measurements includes a measurement at each of:
about one inch into the subterranean formation relative to the wellbore;

about two inches into the subterranean formation relative to the wellbore;
about three inches into the subterranean formation relative to the wellbore; and
about four inches into the subterranean formation relative to the wellbore.

4. The method of claim 1 wherein operating the downhole tool to obtain the plurality of measurements comprises operating the downhole tool to:
emit energy into the subterranean formation; and
detect the emitted energy as it leaves the subterranean formation.

5. The method of claim 4 wherein operating the downhole tool to obtain the plurality of measurements further comprises extending an antenna array pad away from a body of the downhole tool into contact with a wall of the wellbore.

6. The method of claim 4 wherein:
the antenna array pad carries a plurality of transmitters and a plurality of receivers;
emitting energy into the subterranean formation comprises operating the plurality of transmitters; and
detecting the emitted energy as it leaves the subterranean formation comprises operating the plurality of receivers.

7. The method of claim 6 wherein the plurality of different depths of investigation includes four different depths of investigation, and wherein operating the plurality of transmitters to emit energy into the subterranean formation comprises operating the plurality of transmitters to emit electromagnetic energy into the subterranean formation at four different frequencies.

8. An apparatus, comprising:
a processor; and
a memory including coded instructions;
wherein the processor, the memory, and the coded instructions are collectively operable to cause the apparatus to:
obtain a plurality of measurements each at a corresponding one of a plurality of different depths of investigation into a subterranean formation relative to a wellbore extending into the subterranean formation; and
assess mobility of oil within the subterranean formation based on the obtained plurality of measurements,
wherein the processor, the memory, and the coded instructions are collectively further operable to cause the apparatus to:
generate a substantially continuous log of the plurality of measurements as a function of wellbore depth along the wellbore relative to a wellsite surface from whence the wellbore originates;
generate a plurality of curves each representing the determined volume of oil in the subterranean formation proximate a corresponding one of the plurality of different depths of investigation;
generate an oil mobility quicklook graphically depicting oil mobility versus wellbore depth; and
display the generated oil mobility quicklook to an operator.

9. The apparatus of claim 8 wherein the plurality of measurements comprises dielectric measurements.

10. The apparatus of claim 8 wherein the plurality of measurements includes four measurements each at a different depth of investigation into the subterranean formation relative to the wellbore.

11. The apparatus of claim 8 wherein the different depths of investigation are each less than about four inches into the subterranean formation relative to the wellbore.

12. The apparatus of claim 8 wherein the processor comprises a first processor and a second processor, the memory comprises a first memory and a second memory, and the apparatus further comprises:
a downhole tool comprising the first processor and the first memory, wherein the downhole tool is operable to obtain the plurality of measurements; and
surface equipment located at a wellsite surface from whence the wellbore originates, wherein the surface equipment comprises the second processor and the second memory and is operable to assess the mobility of the oil.

13. The apparatus of claim 8 wherein the plurality of measurements comprises a plurality of dielectric permittivity measurements, and wherein the processor, the memory, and the coded instructions are collectively further operable to cause the apparatus to:
determine total porosity of the subterranean formation proximate each of the plurality of different depths of investigation;
determine volume of water in the subterranean formation proximate each of the plurality of different depths of investigation based on the obtained plurality of dielectric permittivity measurements;
determine volume of hydrocarbons in the subterranean formation proximate each of the plurality of different depths of investigation based on:
the determined total porosity of the subterranean formation proximate each of the plurality of different depths of investigation; and
the determined volume of water in the subterranean formation proximate each of the plurality of different depths of investigation; and
assess the mobility of the oil within the subterranean formation based on the determined volume of hydrocarbons proximate each of the plurality of different depths of investigation.

14. The apparatus of claim 8 further comprising a body and an antenna array pad, wherein the processor, the memory, and the coded instructions are collectively further operable to cause the apparatus to:
extend the antenna array pad away from the body into contact with a wall of the wellbore;
emit energy into the subterranean formation from the antenna array pad; and
detect the emitted energy leaving the subterranean formation with the antenna array pad.

15. A method, comprising:
conveying a downhole dielectric tool into a wellbore traversing a subterranean formation,
operating the downhole dielectric tool to obtain a plurality of dielectric permittivity measurements each at a corresponding one of a plurality of different depths of investigation into the subterranean formation relative to the wellbore;
assessing mobility of oil within the subterranean formation based on the obtained plurality of the dielectric permittivity measurements;
wherein a difference in the obtained plurality of the dielectric permittivity measurements indicates the mobility of oil within the subterranean formation.

16. The method of claim 15, further comprising:
determining total porosity of the subterranean formation proximate each of the plurality of different depths of investigation;
determining volume of water in the subterranean formation proximate each of the plurality of different depths of investigation based on the obtained plurality of dielectric permittivity measurements;

determining volume of hydrocarbons in the subterranean formation proximate each of the plurality of different depths of investigation based on:

the determined total porosity of the subterranean formation proximate each of the plurality of different depths of investigation; and the determined volume of water in the subterranean formation proximate each of the plurality of different depths of investigation; and assessing the mobility of the oil within the subterranean formation based on the determined volume of hydrocarbons proximate each of the plurality of different depths of investigation.

17. The method of claim 15, further comprising:

generating a substantially continuous log of the plurality of measurements as a function of wellbore depth along the wellbore relative to a wellsite surface from whence the wellbore originates;

generating a plurality of curves each representing the determined volume of oil in the subterranean formation proximate a corresponding one of the plurality of different depths of investigation;

generating an oil mobility quicklook graphically depicting oil mobility versus wellbore depth; and displaying the generated oil mobility quicklook to an operator.

18. The method of claim 15, wherein the plurality of dielectric permittivity measurements includes a measurement at each of:

about one inch into the subterranean formation relative to the wellbore;

about two inches into the subterranean formation relative to the wellbore;

about three inches into the subterranean formation relative to the wellbore; and about four inches into the subterranean formation relative to the wellbore.

19. The method of claim 15, wherein the downhole dielectric tool comprises a plurality of transmitters that are configured to emit electromagnetic energy into the subterranean formation at a plurality of different frequencies.

* * * * *